United States Patent [19]

Damouth

[11] Patent Number: 5,057,855

[45] Date of Patent: Oct. 15, 1991

[54] THERMAL INK JET PRINTHEAD AND CONTROL ARRANGEMENT THEREFOR

[75] Inventor: David E. Damouth, Rochester, N.Y.

[73] Assignee: Xerox Corporation, Stamford, Conn.

[21] Appl. No.: 464,485

[22] Filed: Jan. 12, 1990

[51] Int. Cl.[5] ........................ G01D 15/18; B41J 2/355

[52] U.S. Cl. ............................ 346/140 R; 346/76 PH

[58] Field of Search ........................ 346/140 R, 76 PH

[56] References Cited

U.S. PATENT DOCUMENTS

| | | | |
|---|---|---|---|
| 4,345,262 | 8/1982 | Shirato et al. | 346/140 R |
| 4,458,256 | 7/1984 | Shirato et al. | 346/140 R |
| 4,463,359 | 7/1984 | Ayata et al. | 346/1.1 |
| 4,668,962 | 5/1987 | Stallkamp | 346/76 PH |

*Primary Examiner*—Benjamin R. Fuller
*Assistant Examiner*—Alrick Bobb
*Attorney, Agent, or Firm*—Robert A. Chittum; Joseph C. Spadacene

[57] ABSTRACT

A thermal ink jet printhead and control arrangement therfor includes a housing defining a plurality of ink receiving and emitting chambers with each chamber extending from an aperture in the ink emitting edge of the housing into the interior thereof. A plurality of heating elements are included, one heating element positioned in each of the chambers. An electrically conductive bus positioned within the housing connects the first terminals of the heating elements together. A power source and control system are also provided. The control system is operable to connect the second terminal of a selected one of the heating elements with the power source while simultaneously connecting the second terminals of the remaining heating elements with an electrical ground so that current from the power source flows through the selected heating element and, thereafter, through the electrically conductive bus and remaining heating elements to electrical ground.

14 Claims, 3 Drawing Sheets

THERMAL INK JET PRINTHEAD AND CONTROL ARRANGEMENT THEREFOR

BACKGROUND OF THE INVENTION

1. Field of the Invention

This invention relates generally to thermal ink jet printing, and more particularly, to a thermal ink jet printhead and control arrangement therefor.

2. Description of the Prior Art

As known in the art, thermal ink jet printing systems include printheads which utilize thermal energy selectively produced by heating elements located in capillary-filled ink channels near channel terminating nozzles or apertures to vaporize the ink momentarily and form temporary bubbles on demand. The rapid formation of a temporary bubble causes an ink droplet to be expelled from the printhead and propelled towards a recording medium. The printhead may be incorporated in either a carriage-type printer or a pagewidth-type printer. The carriage-type printer generally has a relatively small printhead containing the ink channels and nozzles. The printhead is usually sealingly attached to a disposable ink supply cartridge and the combined printhead and cartridge assembly is reciprocated to print one swath of information at a time on a stationary recording medium, such as paper. After the swath is printed, the paper is stepped a distance equal to the height of the printed swath so that the next printed swath will be contiguous therewith. The procedure is repeated until the entire page is printed. In contrast, the pagewidth printer includes a stationary printhead having a length equal to or greater than the width of the paper. The paper is continually moved past the pagewidth printhead in a direction normal to the printhead length and at a constant speed during the printing process.

The printheads described above may be designed to include from several hundred to several thousand individual ink droplet emitting channels, each channel having a heating element positioned therein. Each of the heating elements includes a pair of end portions or "terminals". A pair of input and output leads or electrodes are normally connected to and extend from these end portions. These electrodes provide a means for selectively introducing electrical signals to the heating elements to initiate the ink vaporization and bubble formation processes. However, due to the geometric constraints of the printhead itself, it is extremely impractical to gain access to both electrodes extending from the heating elements positioned within the array of channels formed in the printhead structure. As a result, one electrode of each heating element is generally connected to a common bus which extends between the array of heating elements and the ink emitting edge of the printhead structure. To achieve high printhead performance, it is desired to minimize the width of the common bus since there are known performance advantages in placing the heating elements as close to the ink emitting edge of the structure as possible. For most arrays, this leads to a difficult tradeoff between bus width and image-dependent voltage drops in the bus.

U.S. Pat. No. 4,458,256 provides an example of an ink jet recording apparatus or structure which utilizes a common bus extending between an array of heating elements positioned within the structure and the ink emitting edge of the structure to provide a common return for electrical signals passed through each of the heating elements thereof. This patent discloses an ink jet recording apparatus which includes a first substrate having a plurality of heating elements positioned thereon and a second substrate having an equal plurality of channels formed therein. The first and second substrates are positioned in abutting contact with one heating element located within one channel. An individual input electrode is connected with one end of each of the heating elements. The other end of each of the heating elements is connected with a common bus which may either wrap around the underside of the first substrate or extend to the side thereof. With this arrangement, an electrical signal provided to the input electrode of a selected heating element is passed through the selected heating element and thereafter through the common bus. It is apparent that, with this arrangement, the common bus must be of a mechanical size sufficient to permit the electrical signal to pass therethrough over the entire length of the bus without the introduction of image-dependent voltage drops therein.

Another example of a thermal ink jet printhead which utilizes a common electrical signal return bus is set forth in U.S. Pat. No. 4,463,359. This patent discloses a printhead having one or more ink filled channels which are replenished by capillary action. A resistor or heater is located in each channel upstream from the nozzles. Current pulses representative of data signals are applied to the resistors to momentarily vaporize the ink in contact therewith and form a bubble for each current pulse. Ink droplets are expelled from each nozzle by the growth of the bubbles which causes a quantity of ink to bulge from the nozzle and break off into a droplet at the beginning of the bubble collapse. The current pulses provided to the resistors are thereafter passed through a common bus located along the front and side of the resistor array.

As described, these prior art thermal ink jet printheads each utilize a common bus as the sole return path for electrical signals or pulses passed through selected heating elements of the printhead structure. As a result, the bus itself must be of sufficient mechanical size to carry the full value of the electrical signal or pulse over its entire length in order to prevent the introduction of image-dependent voltage drops therein. In addition, the size requirements of these prior art printhead common bus arrangements preclude optimum placement of the heating elements positioned therein adjacent to the nozzles or apertures of the ink emitting channels.

Therefore, there is generally a need for an improved thermal ink jet printhead structure which overcomes the shortcomings of the prior art. Specifically, the improved thermal ink jet printhead structure must be arranged to provide a common bus connected with the plurality of heating elements of the structure which does not form the sole return path for electrical signals or pulses passed through selected heating elements. This arrangement permits optimum sizing of the common bus and further allows the individual heating elements to be positioned in close proximity to the apertures of the ink emitting channels. In addition, there is a need for a novel control arrangement operable in conjunction with the improved printhead to selectively activate preselected ink emitting channels when it is required to emit an ink droplet and propel the droplet onto a recording medium.

SUMMARY OF THE INVENTION

In accordance with the present invention, there is provided a thermal ink jet printhead which includes a housing defining a plurality of ink receiving and emitting chambers. Each of the chambers extends from an aperture in an edge portion of the housing into the interior thereof. A plurality of heating elements is also provided, each heating element including first and second terminals and positioned within the housing so that at least one of the heating elements is in communication with at least one of the chambers. Electrical connector means connects the first terminals of the heating elements with one another. A power source and control means are also provided. The control means connects the second terminal of a selected one of the heating elements with the power source while simultaneously connecting the second terminals of the remaining heating elements with an electrical ground so that current from the power source flows through the selected heating element and, thereafter, through the electrical connector means and the remaining heating elements to electrical ground.

Further in accordance with the present invention, there is provided a control arrangement for use with a thermal ink jet printhead of the type having a housing defining a plurality of ink receiving and emitting chambers with each chamber extending from an aperture in an edge portion of the housing into the interior thereof, and a plurality of heating elements including first and second terminals with at least one of the heating elements in communication with at least one of the chambers. The control arrangement includes electrical connector means for connecting the first terminals of the heating elements with one another. The control arrangement further includes a power source and control means. The control means is operable to connect the second terminal of a selected one of the heating elements with the power source while simultaneously connecting the second terminals of the remaining heating elements with an electrical ground. With this arrangement, current from the power source flows through the selected heating element and, thereafter, through the electrical connector means and the remaining heating elements to electrical ground.

DESCRIPTION OF THE PREFERRED EMBODIMENT

Figure 1:
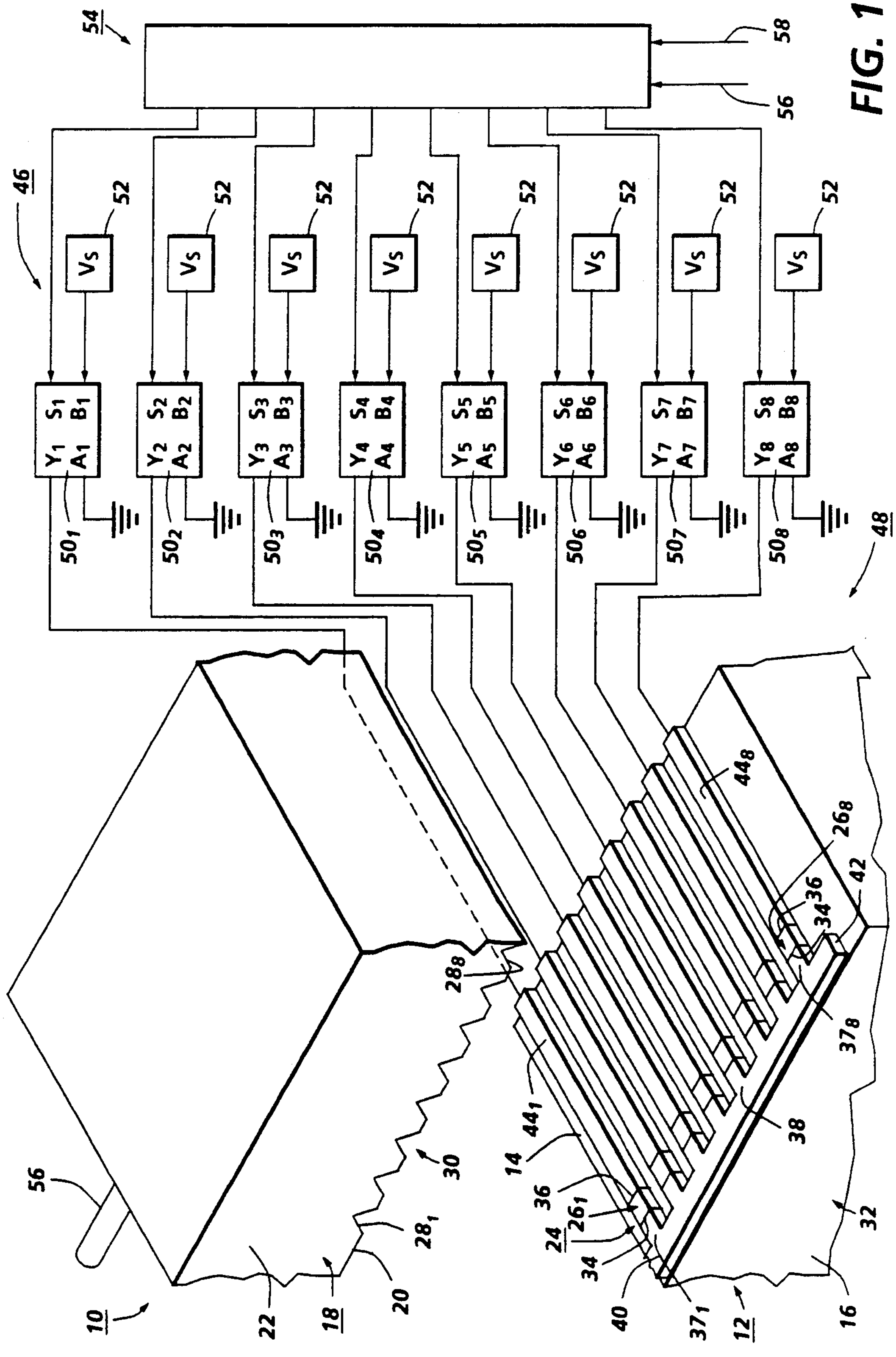
FIG. 1 is an exploded, perspective view of a portion of the thermal ink jet printhead of the present invention, and a general schematic illustration of the control arrangement utilized in conjunction therewith.

Referring to the drawings, and particularly to FIG. 1, there is illustrated an exploded, perspective view of a portion of the thermal ink jet printhead of the present invention generally designated by the numeral 10. Printhead 10 includes a first substrate 12 having a first surface 14 and a first edge portion 16. Printhead 10 further includes a second substrate 18 having a second surface 20 and a second edge portion 22. It should be understood that both first and second substrates 12, 18 may be formed from any material known in the art, and may be fabricated utilizing any known processes.

As seen in FIG. 1, an array 24 of individual heating elements $26_1$–$26_8$ is disposed on first substrate 12 first-surface 14. The heating elements $26_1$–$26_8$ are positioned in substantially parallel relationship, and maybe appropriately spaced to provide between several hundred and several thousand heating elements per inch. As further seen in FIG. 1, second substrate 18 second surface 20 has a plurality of an isotropically etched channels $28_1$–$28_8$ formed therein, the number of channels corresponding to the number of heating elements. In this manner, with first and second substrates 12, 18 brought into abutting contact at their first and second surfaces 14, 20, respectively, to form assembled printhead 10, an individual heating element 26 is positioned in each channel 28. With the first and second substrates 12, 18 positioned in abutting contact, each channel 28 defines a chamber which, as will be described later in greater detail, is operable to receive a water base inking material. The inking material adjacent to the heating element of a particular chamber is elevated to a temperature sufficient to vaporize and form a gas as an electrical signal or pulse is passed through the heating element associated with the chamber. At this elevated temperature, a gas bubble of water vapor forms and thereafter collapses as the pulse clears the heating element. The rapid formation of a vapor bubble result in a droplet of ink being propelled at the aperture (typically shown at 30) of the particular chamber which is formed in the edge portion 32 of printhead 10 and onto a recording medium (not shown).

Each of the heating elements $26_1$–$26_8$ of array 24 includes a pair of schematically illustrated first and second terminals or end portions 34, 36. The first terminals 34 of the heating elements $26_1$–$26_8$ are connected via first electrodes $37_1$–$37_8$ with an electrical connector in the form of an electrically conductive bus generally designated by the numeral 38. Bus 38 is common to each of the heating elements of the array, and is positioned between array 24 and first substrate 12 first edge portion 16. Although the end portions 40, 42 of bus 38 extend beyond the ends of array 24, it should be understood that this is shown only to illustrate that any additional heating elements added to the array would also be connected at their first electrodes to bus 38.

As seen in FIG. 1, the second terminals 36 of the heating elements $26_1$–$26_8$ are connected with second electrodes $44_1$–$44_8$ which are disposed on the first surface 14 of first substrate 12. The second electrode 44 of each heating element 26 is, in turn, connected with a control system 46 which forms a portion of a control arrangement generally designated by the numeral 48. As will be described herein, control arrangement 48 includes bus 38, control system 46 and a power source.

Control system 46 includes a plurality of multiplexing devices $50_1$–$50_8$ each having a pair of first and second terminals A and B, a select input terminal S and an output terminal Y. The output terminals Y of the multiplexing devices $50_1$–$50_8$ are connected with the second electrodes $44_1$–$44_8$ of the heating elements $26_1$–$26_8$. The first terminal A of each multiplexing device 50 is connected with electrical ground and the second terminal B of each multiplexing device 50 is connected with a power source $V_s$ generally designated by the numeral 52. The select input terminal S of each multiplexing device 50 is connected with a signal directing device generally designated by the numeral 54.

Each of the multiplexing devices $50_1$–$50_8$ illustrated in FIG. 1 operates according to the following truth table:

TABLE 1

| |
|---|
| If S = 0, Y = A |
| If S = 1, Y = B |

Thus, when a particular multiplexing device 50 receives a control signal in the form of a digital pulse of value "1" from signal directing device 54, the output terminal Y of the device is connected internally with second terminal B. Since second terminal B of each device 50 is connected with power source 52, and output terminal Y is connected with a particular heating element 26 second electrode 44, providing a control pulse of digital value "1" to a particular multiplexing device 50 establishes a current flow path through the device between power source 52 and the particular heating element connected to the output thereof via its first electrode.

Conversely, when the select input terminal S of a particular multiplexing device 50 receives a control signal in the form of a digital pulse of value "0" from signal directing device 54, or does not receive a control signal, the output terminal Y of the device is connected internally with grounded first terminal A. In this situation, since first terminal A of the device is connected with electrical ground, and output terminal Y is connected with a particular heating element 26 second electrode 44, providing a control signal of digital value "0", or not providing a control signal, establishes a current flow path through the device between the particular heating element 26, its associated second electrode 44 and electrical ground.

As described, each of the multiplexing devices $50_1$–$50_8$ forming a portion of control system 46 is operable to selectively connect the particular heating element $26_1$–$26_8$ connected via its associated second electrode 44 to the output terminal Y thereof with either power source 52 or ground potential, depending upon the value of the digital control pulse at its select input terminal S.

Thus, for example, if it is desired to pass a current signal through selected heating element $26_1$ of array 24 in order to generate thermal energy sufficient to form a vapor bubble, multiplexing device $50_1$ receives a control pulse at its select input terminal $S_1$ of digital value "1". The remainder of, or unselected multiplexing devices $50_2$–$50_8$ either receive a control pulse of digital value "0" or no control pulse at their respective select input terminals $S_2$–$S_8$. Multiplexing device $50_1$ connected with selected heating element $26_1$ provides a current flow path therethrough between power source 52 and selected heating element $26_1$. The remainder of the multiplexing devices $50_2$–$50_8$ provide current paths therethrough between the unselected heating elements $26_2$–$26_8$ and electrical ground. Since all the heating elements of array 24 are connected via their respective first electrodes 37 with bus 38, an overall current flow path is established between power source 52, multiplexing device $50_1$, selected heating element $26_1$, electrical connector 38, and the remainder of the unselected heating elements $26_2$–$26_8$ and their associated multiplexing devices $50_2$–$50_8$ to electrical ground. If the particular chamber defined by channel $28_1$ associated with selected heating element $26_1$ has an inking material therein delivered from an ink distribution channel 56 communicating therewith, the passage of current provided by power source 52 through selected resitsor $26_1$ to electrical ground will cause the inking material in channel $28_1$ to form a momentary vapor bubble, which will result in an ink droplet being propelled from printhead 10 at the aperture of channel $28_1$.

Figure 2:
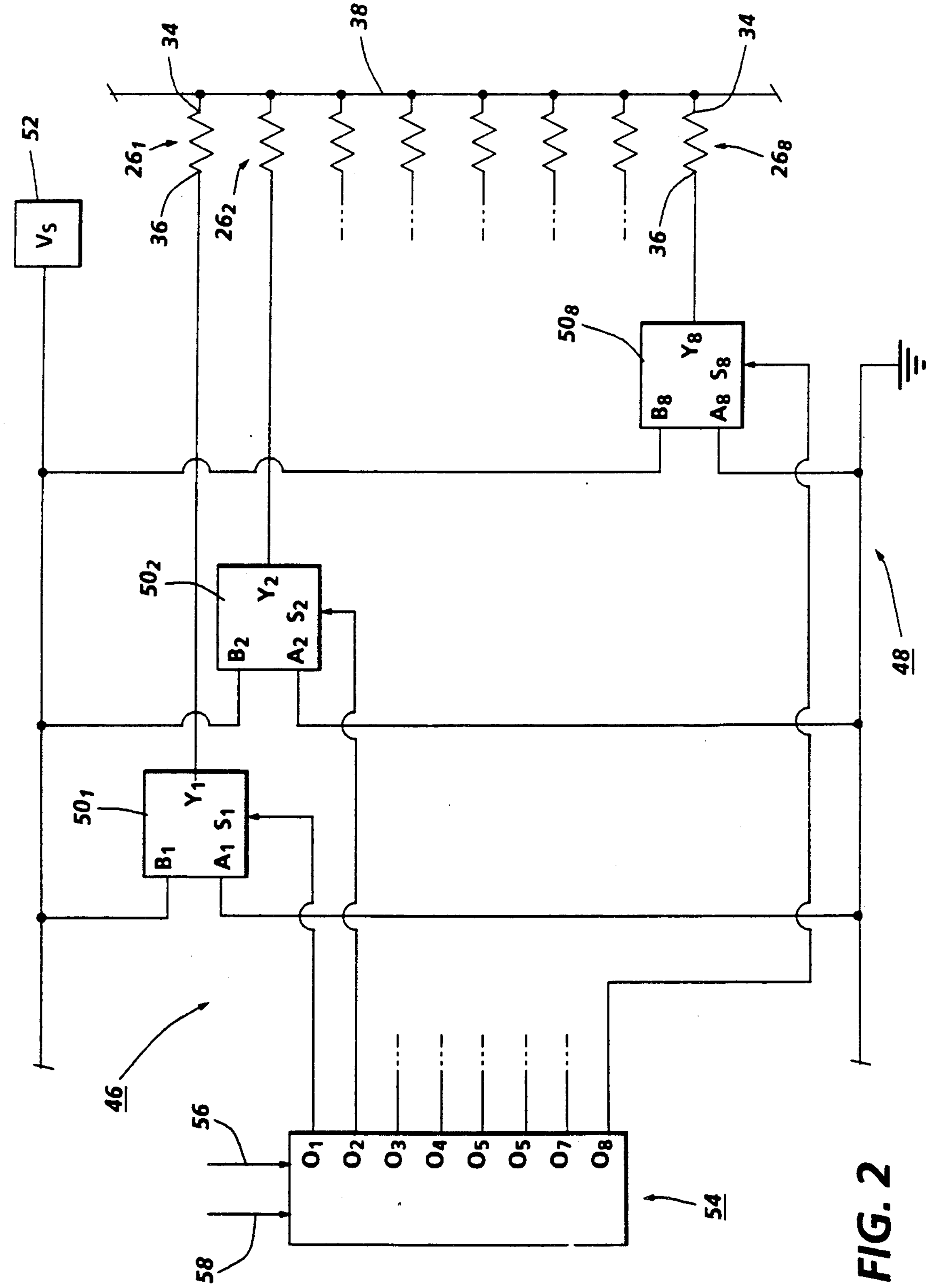
FIG. 2 is a schematic illustration of an array of heating elements forming a portion of the thermal ink jet printhead of 1, and a schematic illustration of the connections between each of the heating elements and the control arrangement.

Now referring to FIG. 2, there is schematically illustrated the array 24 of heating elements $26_1$–$26_8$ and the control system 46 which forms a portion of control arrangement 48. As seen in FIG. 2, the heating elements $26_1$–$26_8$ are resistors whose first and second terminals 34, 36 are connected with electrical connector 38 and multiplexing devices $50_1$–$50_8$, respectively. First and second electrodes 37, 44 have been omitted from FIG. 2 for the sake of clarity. As previously described, each of the multiplexing devices 50 includes first and second terminals A and B, a select input terminal S and an output terminal Y. First and second terminals A and B, and output terminal Y are connected with electrical ground, power source 52 and one of the resistors 26 of array 24. The select input terminal S of each multiplexing device 50 is connected with signal directing device 54.

Signal directing device 54 may be any known device operable to receive a digital input signal from a source (not shown) and direct the received digital input signal as a control signal to a selected one of the multiplexing devices $50_1$–$50_8$. The signal directing device 54 illustrated in FIG. 2 may include, for example, a combination 8-bit shift register and a one-out-of eight selector. The combination 8-bit shift register/one-out-of-eight selector is utilized in conjunction with the printhead 10 illustrated in FIG. 1 since printhead 10 includes eight chambers and eight heating elements.

Signal directing device 54 includes a video input 58, a multiplex select input 60 and eight outputs $O_1$–$O_8$ are connected with the select input terminals $S_1$–$S_8$ of the plurality of multiplexing devices $50_1$–$50_8$. Video input 58 is operable to receive a series of digital input signals from a source (not shown) representative of an image to be printed by printhead 10 on a recording medium (not shown). These signals are eventually outputted by signal directing device 54 as control signals to the array of multiplexing devices $50_1$–$50_8$ select input terminals. Multiplex select input 60 receives a series of multiplex select signals utilized internally by signal directing device 54. These signals identify which of the heating elements $26_1$–$26_8$ should be connected with power source 52 at a given instant of time to ensure accurate printing of the image on the recording medium. Thus, the series of digital input signals provided to signal directing device 54 on video input 58 and the series of multiplex select signals provided on multiplex select input 60 are coordinated to provide that the proper multiplexing device receives a control signal of value "1" when required. This ensures that the proper heating element 26 is energized at the proper time to thereby produce an ink jet image on the recording medium which is an accurate rendition of the actual image to be printed.

Figure 3:
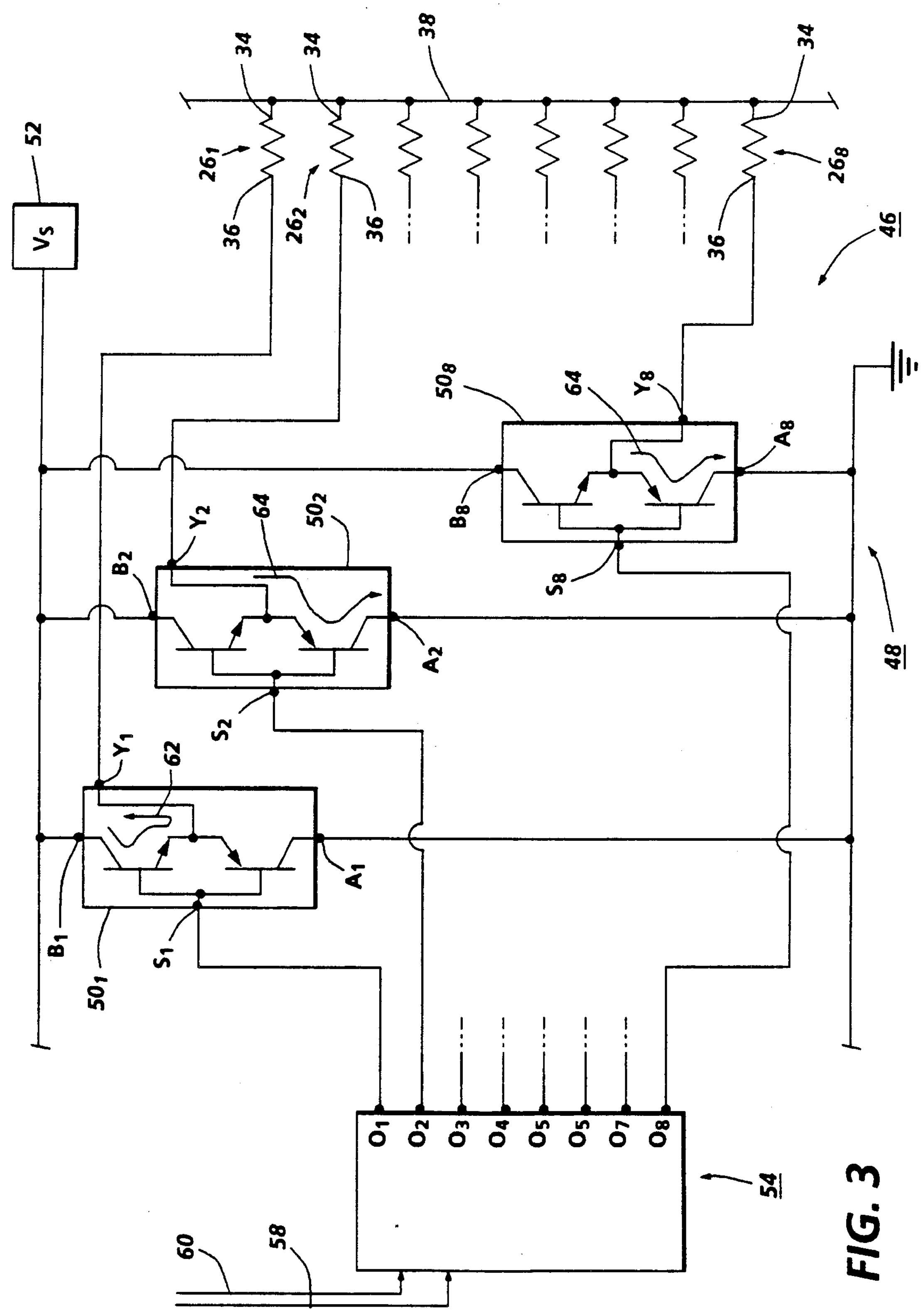
FIG. 3 is a view similar to 2, illustrating by way of example the use of bipolar transistors to form a portion of the control arrangement for energizing selected heating elements of the array.

Now referring to FIG. 3, there is schematically illustrated the array of heating elements $26_1$–$26_8$ and control system 46 which forms a portion of control arrangement 48. As in FIG. 2, first and second electrodes 37, 44 have been omitted from FIG. 3 for clarity. As seen in FIG. 3, each of the multiplexing devices $50_1$–$50_8$ is illustrated as a bipolar transistor arrangement. Each of the bipolar transistor arrangements includes the first and second terminals A and B, select input terminal S and output terminal Y previously described. The select input terminals of the bipolar transistor arrangements $50_1$–$50_8$ are connected with the outputs $O_1$–$O_8$ of signal directing device 54.

In order to pass a current signal through heating element $26_1$ to cause the inking material in the chamber associated therewith to form an ink bubble and discharge the ink droplet at the aperture thereof, control arrangement 48 is operated as follows. A control pulse of value "1" is provided from the output $O_1$ of signal directing device 54 to the select input $S_1$ of bipolar transistor or multiplexing device $50_1$. The digital pulse of value "1" biases the bipolar transistor so that a current flow path is established therethrough as indicated by the directional arrow 62. With the current flow path established through bipolar transistor $50_1$ as illustrated, a current flow path is also established between power source 52 and heating element $26_1$. While signal directing device 54 provides a control pulse to multiplexing device $50_1$ of value "1", it simultaneously provides control pulses of value "0", or no control pulses, to the select input terminals $S_2$–$S_8$ of the remaining multiplexing devices $50_2$–$50_8$. Providing a control pulse of value "0" or no control pulse to the select input terminals $S_2$–$S_8$ of the remaining multiplexing devices $50_2$–$50_8$ establishes current flow paths through these devices represented by the directional arrows 64. Thus, the remaining heating elements $26_2$–$26_8$ are connected through their associated multiplexing devices $50_2$–$50_8$ to ground potential. Since the heating elements $26_1$–$26_8$ are connected at their first terminals 34 to an electrically conductive bus 38, an overall current flow path is established between power source 52, multiplexing device $50_1$, heating element $26_1$, bus bar 38, and the remaining heating elements $26_2$–$26_8$ and multiplexing devices $50_2$–$50_8$ to ground potential. As a current signal is passed through heating element $26_1$, a vapor bubble is formed in channel $28_1$ resulting in an ink droplet being propelled therefrom. It should be understood that a current signal will flow through heating element $26_1$ only for as long as a control signal of value "1" is provided to the select input terminal $S_1$ of multiplexing device $50_1$. The magnitude of the control signal is selected to properly bias the bipolar transistor, and when the control signal is removed from select input terminal $S_1$, the current flow path through multiplexing device $50_1$ is interrupted.

As described herein, a selected heating element of an array of heating elements may be connected with a power source while the remaining heating elements of the array simultaneously connected with electrical ground. The current from the power source that flows through the selected heating element is passed through an electrically conductive bus and through the remaining heating elements which are connected in parallel relationship. With this arrangement, the common bus may itself be ungrounded. In addition, each of the remaining heating elements sees only a portion of the current flowing through the selected heating element. The full value of the current flowing through the selected heating element flows through only that portion of the bus between the selected heating element and the nonselected heating element directly adjacent thereto. Since the full value of current is seen by only a relatively small portion of the bus, the mechanical dimensions of the bus may be reduced. In addition, for example, if one heating element is energized and seven heating elements are connected to electrical ground, each of the seven grounded heating elements sees $(1/7)^2 \times R$ or $(1/49) \times R$ the power generated by the selected resistor. Assuming that each of the heating elements has approximately the same value of resistance, then each of the heating elements utilized to provide a path to electrical ground sees only about 1/49 or approximately 2% of the power generated by the selected resistor. It should be understood that the number of channels and heating elements illustrated in FIGS. 1–3 is merely an example of the number of channels and heating elements which may be utilized in printhead 10. In addition, although it has been described herein to select only one heating element of the array and utilize the remaining heating elements to direct the current passed through the selected heating element to ground, any number of heating elements may be selected simultaneously without departing from the spirit of this invention.

Although the present invention has been described in terms of what are at present believed to be its preferred embodiments, it will be apparent to those skilled in the art that various changes may be made without departing from the scope of the invention. It is therefore intended that the appended claims cover such changes.

I claim:

1. A thermal ink jet printhead, comprising:

a housing defining a plurality of ink receiving and emitting chambers with each chamber extending from an aperture in an edge portion of the housing into the interior thereof;

a plurality of heating elements each including first and second terminals and positioned within said housing, at least one of said heating elements in communication with at least one of said chambers;

electrical connector means for connecting the first terminal of each of said heating elements with one another, wherein said electrical connector means is positioned within said housing adjacent to said edge portion, and having a reduced size so that said electrical connector means is insufficient to provide a sole means to electrical ground and thereby enabling the heating elements to be placed a predetermined distance from said apertures;

a power source; and control means for connecting the second terminal of a selected one of said heating elements with said power source while simultaneously connecting the second terminals of the remaining heating elements with an electrical ground so that current from said power source flows through a selected one of said heating elements and, thereafter, through said electrical connector means and said remaining heating elements to electrical ground, thereby providing a path to electrical ground through both the electrical connector means and the remaining heating elements.

2. The thermal ink jet printhead of claim 1, wherein said housing includes:

a first substrate having a first surface and a first edge portion;

a second substrate having a second surface and a second edge portion;

a plurality of channels formed in said second substrate second surface and opening at said second edge portion;

said first and second substrates being positioned in abutting relation at their first and second surfaces, respectively, so that said plurality of channels define said plurality of chambers and said first and second substrates first and second edge portions define said housing edge portion;

said pluralty of heating elements being disposed on said first substrate first surface with one each one of said heating elements positioned within one of said chambers; and said electrical connector means is positioned on said first substrate first surface within said housing adjacent to said first edge portion.

3. The thermal ink jet printhead of claim 1, wherein said control means includes:

signal directing means for providing a plurality of control pulses; and a plurality of multiplexing devices each having a first terminal connected with said power source, a second terminal connected to electrical ground, a select input terminal and an output terminal connected with the second terminal of one of said heating elements, each multiplexing device normally providing a first current flow path between the output terminal and the second terminal and a second current flow path between the first terminal and the output terminal in response to a control pulse from said signal directing means at the select input terminal, wherein one of said multiplexing devices connected with said selected heating element being operable in response to a control pulse received from said signal directing means to provide a second current flow path therethrough between said power source and the output terminal thereof so that current from said power source flows through said multiplexing device connected to said selected heating element and said selected heating element and, thereafter, through said electrical connector means and the remaining heating elements and multiplexing devices to electrical ground.

4. The thermal ink jet printhead of claim 3, wherein each one of said multiplexing devices includes a bipolar transistor.

5. The thermal ink jet printhead of claim 3, wherein said signal directing means includes:

an eight bit shift register; and a one-out-of-eight selector in combination with said eight bit shift register.

6. The thermal ink jet printhead of claim 3, wherein:

said plurality of heating elements includes a plurality of resistors each having a pair of first and second lead electrodes connected with their first and second terminals, respectively, and extending therefrom;

said electrical connector means includes an electrically conductive bus for electrically connecting said plurality of resistors together at their respective first lead electrodes; and the second lead electrode of one of said resistors is connected with the output terminal of one of said multiplexing devices.

7. The thermal ink jet printhead of claim 3, wherein said housing includes means communicating with each of said chambers for introducing an inking material therein with a vapor bubble being formed within the chamber associated with said selected heating element resulting in an ink droplet being emitted from the aperture of the housing when a current signal from said power source flows through said selected heating element.

8. A control arrangement for use with a thermal ink jet printhead having a housing defining a plurality of ink receiving and emitting chambers with each chamber extending from an aperture in an edge portion of the housing into the interior thereof, and a plurality of heating elements including first and second terminals with at least one heating element being in communication with at least one of said chambers, comprising:

electrical connector means for connecting the first terminal of each of said heating elements with one another, wherein said electrical connector means is positioned within said housing adjacent to said edge portion, and having a reduced size so that said electrical connector means is insufficient to provide a sole means to electrical ground and thereby enabling the heating elements to be placed a predetermined distance from said apertures;

a power source; and control means for connecting the second terminal of a selected one of said heating elements with said power source and for simultaneously connecting the second terminals of the remaining heating elements to an electrical ground so that current from said power source flows through a selected one of said heating elements and, thereafter, through said electrical connector means and said remaining heating elements to electrical ground, thereby providing a path to electrical ground through both the electrical connector means and the remaining heating elements.

9. The control arrangement of claim 8, wherein said control means includes:

signal directing means for providing a plurality of control pulses; and a plurality of multiplexing devices each having a first terminal connected with said power source, a second terminal connected to electrical ground, a select input terminal and an output terminal connected with the second terminal of one of said heating elements, each multiplexing device normally providing a first current flow path between the output terminal and the second terminal and a second current flow path between the first terminal and the output terminal in response to a control pulse from said signal directing means at the select input terminal, wherein one of said multiplexing devices connected with said selected heating element being operable in response to a control pulse received from said signal directing means to provide a second current flow path therethrough between said power source and the output terminal thereof so that current from said power source flows through said multiplexing device connected to said selected heating element and said selected heating element and, thereafter, through said electrical connector means and said remaining heating elements and multiplexing devices to electrical ground.

10. The control arrangement of claim 9, wherein each one of said plurality of heating elements includes a resistor.

11. The control arrangement of claim 9, wherein each one of said multiplexing devices includes a bipolar transistor.

12. The control arrangement of claim 9, wherein said signal directing means includes:

an eight bit shift register; and a one-out-of-eight selector in combination with said eight bit shift register.

13. The control arrangement of claim 9, wherein said electrical connector means includes an electrically conductive bus.

14. The control arrangement of claim 9, wherein said housing includes means communicating with each of said chambers for introducing an inking material therein with a vapor bubble being formed within the chamber associated with said selected heating element resulting in an ink droplet being emitted from the aperture of the housing when a current signal from said power source flows through said selected heating element.

* * * * *